Patented Mar. 18, 1952

2,589,705

UNITED STATES PATENT OFFICE 2,589,705

TREATMENT OF AEROGELS TO RENDER THEM WATERPROOF

Samuel S. Kistler, West Boylston, Mass.

No Drawing. Application July 29, 1944, Serial No. 547,310

4 Claims. (Cl. 117—106)

This invention relates to the treatment of aerogels for the purpose of rendering them waterproof or water-repellent.

When aerogels are employed as an insulation medium under temperature conditions below the dew point of the surrounding atmosphere, condensation is apt to occur and cause wetting of the aerogel with consequent reduction in its insulating properties. Moreover, in some insulated structures the aerogel sometimes comes into direct contact with water and thereby becomes less effective for its intended purpose. To overcome these problems, numerous attempts have been made to render aerogels waterproof or water-repellent, as for example by incorporating water-repellent materials, such as oils, stearates, and the like in the alcogel or alcosol prior to autoclaving. None of these attempts were very successful, however, in view of the fact that the hydrophobic agent was destroyed by autoclaving temperatures. The application of the hydrophobic agent to the finished aerogel by first dissolving the agent in a suitable liquid solvent has also been considered, but such treatment is not very practical in view of the fact that the solvent destroys or seriously alters the aerogel structure by subjecting it to great compression forces created by surface tension at the gas-liquid interfaces.

It is accordingly a primary object of this invention to provide a practical method of rendering aerogels waterproof or water-repellent, which method may be carried out on a commercial scale.

Still further objects and advantages of the invention will appear from the following description and appended claims. Before explaining in detail the present invention, however, it is to be understood that the invention is not limited in its application to the details described herein, since the invention is capable of other embodiments and of being practiced or carried out in various ways.

The purpose of this invention may be accomplished in general by exposing the aerogel to vapors of one of the methyl chloro-silicanes or to vapors of a mixture of these materials. Thus, it is possible to use monomethyl trichloro silicane, dimethyl dichloro silicane, or trimethyl monochloro silicane, or a mixture of such compounds may be employed.

For best results the silicane vapors should be diluted with a gas, and preferably with a gas which does not support combustion, such as nitrogen, to eliminate explosion hazards. However, air may be used with reasonable safety, when only small amounts of aerogel are being treated.

In the course of the treatment of the aerogel, some hydrogen chloride is formed as a result of hydrolysis of the silicanes with the water layer usually found adsorbed on most surfaces. For certain uses of the aerogels it is desirable that this hydrogen chloride be removed. This can be accomplished by exposing the treated aerogel to a stream of air heated to about 300° C., or as an alternative the hydrogen chloride may be neutralized to form ammonium chloride, which is less harmful than hydrogen chloride, by gassing with $NH_3$ until the odor of $NH_3$ persists.

A further understanding of the invention will be obtained from the following examples:

Example I

A silica aerogel was prepared by autoclaving a sol consisting of 6 grams of $SiO_2$ dispersed in 94 grams of an aqueous alcohol solution containing 70% by weight of ethyl alcohol and 30% water at temperatures and pressures in excess of the critical temperature and pressure of the alcohol solution. One and thirty-nine hundredths grams of the resulting aerogel were placed in a vertical tube provided in its lower end with a fine mesh screen. Dry air, saturated at 25° C. with the vapors of a mixture of methyl chloro-silicanes consisting of dimethyl dichloro-silicane and small amounts of trimethyl chloro-silicane and methyl trichloro-silicane and having an average molecular weight of about 130, was passed up through the bed of aerogel at the rate of 140 cubic centimeters per minute for six minutes, the air being mixed with an equal volume of air saturated with water vapor at 25° C. just prior to introduction into the tube containing the aerogel. The aerogel thus treated showed marked water-repellency, which continued to improve for several hours after treatment. The high degree of repellency obtained at the end of this aging period appeared to be permanent. During the above treatment the aerogel gained 0.23 grams in weight.

Example II

Silica aerogel prepared as described in Example I of the Kistler Patent No. 2,188,007 was continuously fed at the rate of 5.1 pounds per hour into the high end of a cylinder about 4 feet long and 12 inches in diameter rotating at 20 revolutions per minute on an axis inclined 12° from the horizontal. Vapors of a mixture of methyl chloro-silicanes of the same composition as the methyl chloro-silicane mixture described in Example I were produced in a steel tank provided with steam coils and continuously supplied to the high end of the rotating cylinder at the rate of 3.0 pounds per hour by means of a flow meter and pipe line, and then passed over the aerogel. The pipe line was provided with a T for blending the vapors of the methyl chloro-silicane mixture with nitrogen gas supplied at the rate of 60 cubic feet per hour. The treated aerogel overflowed continuously from the lower end of the cylinder. It was then exposed to a stream of air at about 300° C. for the purpose of removing the hydrogen chloride resulting from hydrolysis of the silicane mixture. The resulting product was found to be highly water-repellent.

Although the examples refer solely to the treatment of silica aerogel, equally good results can be obtained upon treating other aerogels, such as aerogels of alumina and the oxides of iron, magnesium and chromium.

Aerogels treated in the manner described herein may be applied or used in various ways which were not practical for untreated gels. For example, they are admirably adapted for use in life jackets, in which case they not only provide buoyancy, but also heat insulation.

It is believed the effectiveness of the silicanes in waterproofing aerogels is due to a reaction taking place between the silicane and the water layer usually found adsorbed on most surfaces, whereby the silicane first hydrolyzes to form a silicol, and then condenses to form a silicone resin or polymer. The resulting silicone is apparently oriented on the surface in such a way that the hydrogens of the methyl groups extend outward, thereby creating a hydrophobic surface.

What I claim is:

1. The method of waterproofing silica aerogel which comprises passing into intimate contact with said aerogel vapors of a mixture of methyl chloro-silicanes consisting of dimethyl dichloro-silicane and small amounts of methyl trichloro-silicane and trimethyl monochloro-silicane and having an average molecular weight of 130, said vapors being diluted with nitrogen gas, and then exposing the treated aerogel to a stream of air heated to about 300° C. to remove the hydrogen chloride formed.

2. The method of waterproofing silica aerogel which comprises passing into intimate contact with said aerogel vapors of a mixture of methyl chloro-silicanes consisting of dimethyl dichloro-silicane and small amounts of methyl trichloro-silicane and trimethyl monochlorosilicane and having an average molecular weight of 130, said vapors being diluted with nitrogen gas, and then removing the hydrogen chloride formed by gassing the treated aerogel with $NH_3$.

3. The method of waterproofing silica aerogel which comprises passing into intimate contact with said aerogel, vapors of a mixture of methyl chloro-silicanes consisting of dimethyl dichloro-silicane and small amounts of methyl trichloro-silicane and trimethyl monochloro-silicane and having an average molecular weight of 130, said vapors being first diluted with an inert gas incapable of supporting combustion, and then removing the hydrogen chloride formed.

4. The method of waterproofing silica aerogel which comprises passing into intimate contact with said aerogel vapors of a mixture of methyl chloro-silicanes consisting of dimethyl dichloro-silicane and small amounts of methyl trichloro-silicane and trimethyl monochloro-silicane and having an average molecular weight of 130, said vapors being first diluted with an inert gas incapable of supporting combustion, then removing the hydrogen chloride formed and allowing the treated aerogel to stand, whereby a silicone resin coating is formed thereon.

SAMUEL S. KISTLER.

REFERENCES CITED

The following references are of record in the file of this patent:

UNITED STATES PATENTS

| Number | Name | Date |
| --- | --- | --- |
| 2,265,962 | Bent et al. | Dec. 9, 1941 |
| 2,306,222 | Patnode | Dec. 22, 1942 |
| 2,380,996 | Rochow et al. | Aug. 7, 1945 |
| 2,383,653 | Kirk | Aug. 28, 1945 |
| 2,424,853 | Safford | July 29, 1947 |
| 2,428,608 | Bass | Oct. 7, 1947 |
| 2,436,304 | Johannson | Feb. 17, 1948 |
| 2,439,689 | Hyde | Apr. 13, 1948 |
| 2,441,422 | Krieble et al. | May 11, 1948 |
| 2,510,661 | Safford | June 6, 1950 |

OTHER REFERENCES

Comptes Rendus, 1939, vol. XXV, No. 7, Protective Films on Iron From the Vapour of Silica Organic Compounds, I. D. Yudin, pp. 614 to 617.